United States Patent [19]

Ludwig

[11] Patent Number: 4,573,498
[45] Date of Patent: Mar. 4, 1986

[54] BALL VALVE

[75] Inventor: Albert R. Ludwig, Holiday, Fla.

[73] Assignee: General Signal Corporation, Stamford, Conn.

[21] Appl. No.: 594,646

[22] Filed: Mar. 29, 1984

[51] Int. Cl.$^4$ .................... F16K 11/087; F16K 5/20
[52] U.S. Cl. ................... 137/625.47; 251/315
[58] Field of Search ............ 137/625.47, 625.46, 137/625.21, 625.22, 625.23, 625.24, 625.15, 625.16, 625.41; 251/315

[56] References Cited

U.S. PATENT DOCUMENTS

| | | | |
|---|---|---|---|
| 1,685,330 | 9/1928 | Maroney | 137/625.47 X |
| 2,000,552 | 5/1935 | Zaikowsky | 137/625.47 X |
| 2,475,702 | 7/1949 | Funke | 137/625.47 X |
| 2,698,731 | 1/1955 | Koehler et al. | 251/315 X |
| 3,684,241 | 8/1972 | Hartmann et al. | 251/315 X |
| 3,976,102 | 8/1976 | Crocker | 137/625.47 |

OTHER PUBLICATIONS

Pearson, G. H., "The Design of Valves and Fittings", p. 9, FIG. 2.2, Sir Isacc Pitman & Sons, Ltd., London (1953).

Primary Examiner—Martin P. Schwadron
Assistant Examiner—John S. Starsiak, Jr.
Attorney, Agent, or Firm—William G. Miller, Jr.; Harold Huberfeld

[57] ABSTRACT

A ball valve is provided which has a ball stem machined to have a through hole connecting the inlet and outlet port of the valve body when the stem is in a first rotational position. The valve body has a drain port which is aligned with the axis of the stem. When the stem is rotated 90° the drain is connected to both the inlet and outlet ports. This connection is provided by a slot extending over 180° of the periphery of the ball end of the stem in a plane normal to the axis of the through hole.

3 Claims, 4 Drawing Figures

BALL VALVE

BACKGROUND OF THE INVENTION

This invention relates to ball valves and more particularly to ball valves capable of providing flow between an inlet and an outlet port when the valve stem is in one rotational position and for providing connection to a third port from both the inlet and outlet sides of the valve when the valve stem is in another rotational position.

In certain valving arrangements for controlling fluid flow, it is desireable to have a means for selectively connecting a line to a drain. While others have provided valves which can be interposed in a line to provide drainage for the line, these valves have provided connection of the drain to the inlet port or to the outlet port, but it has not been possible to provide drainage simultaneously from both the inlet and outlet port of the valve as is sometimes necessary to minimize the residual volume of fluid in the system.

It is an object of this invention to provide a valve which will allow flow between an inlet and outlet port when the valve stem is in one rotational position and to provide a connection to a third port, such as a drain, from both the inlet and outlet port, simultaneously.

SUMMARY OF THE INVENTION

A ball valve is provided which has a ball stem machined to have a through hole connecting a first and second port in a valve body when the stem is in a first rotational position. The valve body has a third port which is aligned with the axis of the stem. When the stem is rotated 90° simultaneous connection between the third port and both the inlet and outlet ports is provided by a slot extending over 180° of the periphery of the ball stem in a plane normal to the axis of the through hole. Preferably the through hole is of the same diameter as the inlet and outlet port so that there is no restriction to flow through the valve.

BRIEF DESCRIPTION OF THE DRAWINGS

In the drawings, where like reference characters refer to like elements.

DESCRIPTION OF THE PREFERRED EMBODIMENT

Figure 1:
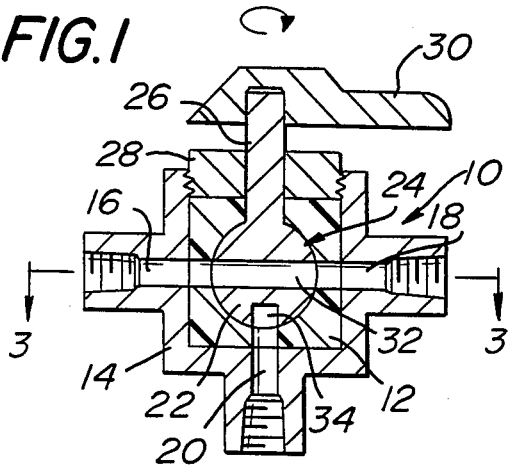
FIG. 1 is a sectional view of a valve constructed in accordance with the present invention with the stem in a first rotational position.

One form of the invention is shown in FIG. 1 where the valve body 10 is made up of a packing 12 and a housing 14. The housing 14 has an inlet port 16 and an outlet port 18 as well as a third port 20 which is on an axis normal to the common axis of the inlet and outlet ports, 16 and 18. These ports provide a flow connection to the interior of the housing 14. This interior is cylindrical and contains the packing 12 which is made up of somewhat similar top and bottom pieces, which divide along the horizontal plane of the inlet and outlet ports. Thus, the top piece has a hemispherical recess for receiving the top half of the ball end 22 of a ball stem 24 whose stem end 26 extends through a hole in the top piece and projects from the valve body along the axis of the third port 20. The bottom piece of the packing also has a hemispherical recess for receiving the bottom half of the ball end 22 with a hole being provided in the bottom piece for connecting with and forming part of the port 20. Both the top and bottom pieces have semi-cylindrical recesses which form continuations of the inlet and outlet ports, 16 and 18 when the two halves are assembled.

The two halves of the packing are assembled around the stem 24 and the resulting assembly is inserted into the cylindrical interior of the housing 14 so that the holes of the assembly line up with the respective ports in the housing. The packing and the stem are retained in their operating position in the housing by a packing nut 28 which is tightened sufficiently to provide sealing between the two halves of the packing and a close bearing surface with the ball end of the stem, but without causing the stem to bind excessively when a handle 30, shown connected to the stem 24, is turned through its two useful rotational positions.

The ball end 22 of the stem 24 is provided with a through hole 32 which aligns with the common axis of the inlet and outlet ports, 16 and 18, when the stem is in a first rotational position as shown in FIG. 1. In this position fluid flow is permitted between the inlet and outlet ports and the third port 20 is closed off.

Figure 2:
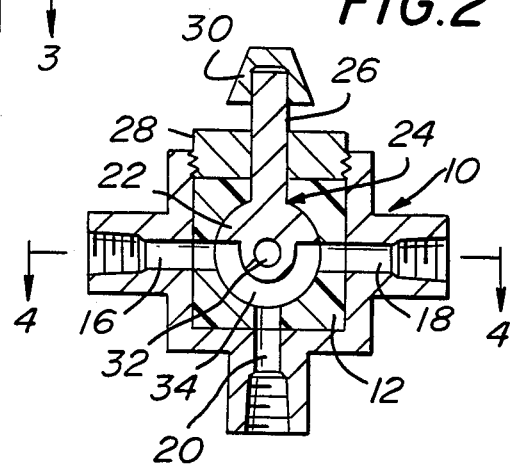
FIG. 2 is a sectional view of the valve shown in FIG. 1 with the stem in a second rotational position 90° from said first position.
Figure 3:
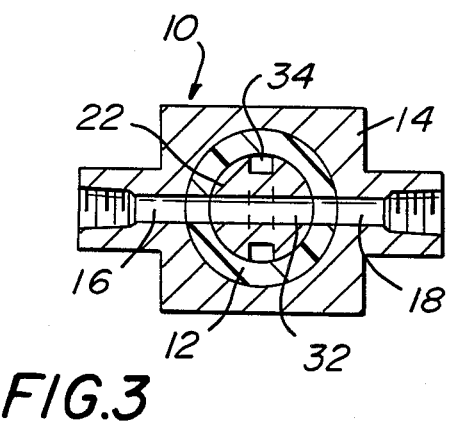
FIG. 3 is a sectional view taken along line 3—3 of FIG. 1.
Figure 4:
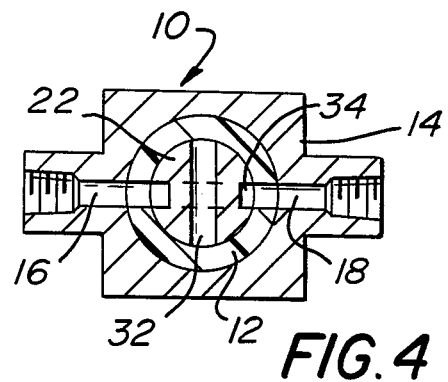
FIG. 4 is a sectional view taken along line 4—4 of FIG. 2.

Since it is desired to provide a simultaneous connection between the third port and both the inlet and outlet ports upon a rotation of the stem through 90°, there is provided a slot 34 which extends over 180° of the periphery of the ball end of the stem in a plane normal to the axis of the through hole 32. When the stem has been turned through 90° from its first rotational position to its second postion, this slot provides a passage connecting both the inlet port 16 and the outlet port 18 to the third port 20, as shown in FIG. 2.

With the construction described above and shown in the figures, a substantially unrestricted flow from the inlet port to the outlet port can be provided, if the through hole 32 is of the same diameter as the inlet and outlet ports formed by the housing and packing portions of the valve body. The unrestricted normal flow can be interrupted by turning the handle 30 through 90° to the position, as shown in FIG. 2, which then will allow the connection of the third port simultaneously to the inlet and outlet ports. This simultaneous connection can be useful in draining the lines connected to the inlet and outlet ports, if the third port is connected with a drain.

In order to accurately position the stem in the two positions described above by rotation of the handle through 90°, there is provided a mechanical stop built into the handle and the valve body (not shown). By this means, the hole or the slot may be precisely aligned with the inlet and outlet ports.

This valve structure can, if desired, be utilized to advantage in other arrangements. For example, if it where desired to mix a fluid introduced at the third port to the fluid stream normally flowing between the inlet and outlet ports, the stem can be turned to its second rotational position, as shown in FIG. 2, to provide for the mixing and then, when there has been enough of the fluid from the third port mixed in the stream, the valve stem can be rotated back to its first position, as shown in FIG. 1, to renew the normal flow path between the inlet and outlet ports. Other possible uses for this valve structure will be evident to those skilled in the art.

In a typical valve structure of the type shown in FIGS. 1 and 2, the packing 12 would be teflon and the housing would be made of a metal, such as brass, machined as shown in the figures. The stem also can be of a metal, such as brass, as can the packing nut 28. The ports 16, 18, and 20 and the through hole 32 will normally be made by drilling, and the slot will normally be made by millng the ball end 22 of the stem 24.

What is claimed is:

1. In a ball valve having a ball stem machined to have a through hole connecting first and second ports in the body of the valve when the stem is in a first rotational position, the improvement comprising:
   a third port along the axis of said stem; and
   a slot extending over 180° of the periphery of said ball stem in a plane normal to the axis of said through hole for simultaneously connecting said first and second ports to said third port in a second rotational position of said stem 90° from said first rotational position.

2. A ball valve comprising:
   a valve body having an inlet port and outlet port of the same diameter and aligned along the same axis and a drain port aligned along an axis normal to that of said inlet and outlet ports; and
   a ball stem having a ball end and a stem end, said ball stem being mounted in said valve body for rotation therein about its axis, said stem axis being aligned with the axis of said drain port with the stem extending from the valve body 180° from the drain port, and the ball end of said stem having
      a through hole of the same diameter as said inlet and outlet ports and aligned with said ports when said stem is in a first rotational position to provide unrestricted flow between said inlet and outlet ports,
      a slot extending over 180° of the periphery of said ball end in a plane normal to the axis of said through hole, said slot providing drainage from both the inlet and outlet ports through the drain port when said stem is in a second rotational position 90° from said first rotational position.

3. A ball valve comprising:
   a valve body having an inlet port and outlet port of the same diameter and aligned along the same axis and a drain port aligned along an axis normal to that of said inlet and outlet ports, said valve body including packing constructed to accept a ball end of a stem and to form apertures which align with the ports in a housing portion of said body containing said packing; and
   a ball stem having a ball end and a stem end, said ball stem being mounted in the packing portion of said valve body for rotation therein about its axis, said stem axis being aligned with the axis of said drain port with the stem extending from the valve body 180° from the drain port, and the ball end of said stem having
      a through hole of the same diameter as said inlet and outlet ports and aligned with said ports when said stem is in a first rotational position to provide unrestricted flow between said inlet and outlet ports,
      a slot extending over 180° of the periphery of said ball end in a plane normal to the axis of said through hole, said slot providing drainage from both the inlet and outlet ports through the drain port when said stem is in a second rotational position 90° from said first rotational position.

* * * * *